March 27, 1962 G. J. BAUDHUIN Re. 25,145

SELF-PROPELLED MOBILE LIFT

Original Filed Oct. 8, 1958 7 Sheets-Sheet 1

Inventor
George J. Baudhuin
By McCanna, Morsbach & Pillote
Atty's

SELF-PROPELLED MOBILE LIFT

Original Filed Oct. 8, 1958 7 Sheets-Sheet 2

Inventor
George J. Baudhuin
By McCanna, Morsbach & Pillote
Atty's

SELF-PROPELLED MOBILE LIFT

Original Filed Oct. 8, 1958 7 Sheets-Sheet 3

Inventor
George J. Baudhuin
By McCanna, Morsbach & Pillote
Atty's

SELF-PROPELLED MOBILE LIFT

Original Filed Oct. 8. 1958 7 Sheets-Sheet 4

Inventor
George J. Baudhuin
By McCanna, Morsbach & Pillote
Atty's

SELF-PROPELLED MOBILE LIFT

Original Filed Oct. 8, 1958 7 Sheets-Sheet 5

Inventor
George J. Baudhuin
By McCanna, Morsbach & Pillote
Atty's

SELF-PROPELLED MOBILE LIFT

Original Filed Oct. 8, 1958 7 Sheets-Sheet 6

Inventor
George J. Baudhuin

By McCanna, Morsbach + Pillote
Atty's

SELF-PROPELLED MOBILE LIFT

Original Filed Oct. 8, 1958 7 Sheets-Sheet 7

Inventor
George J. Baudhuin
By McCanna, Morsbach & Pillet
Atty's

United States Patent Office

Re. 25,145
Reissued Mar. 27, 1962

25,145
SELF-PROPELLED MOBILE LIFT

George J. Baudhuin, Sturgeon Bay, Wis., assignor to Drott Manufacturing Corporation, Milwaukee, Wis., a corporation of Wisconsin Original No. 2,909,298, dated Oct. 20, 1959, Ser. No. 766,086, Oct. 8, 1958. Application for reissue Oct. 18, 1961, Ser. No. 146,409
19 Claims. (Cl. 214—396)

Matter enclosed in heavy brackets [ ] appears in the original patent but forms no part of this reissue specification; matter printed in italics indicates the additions made by reissue.

The present invention relates to improvements in self-propelled mobile lifts and particularly to a mobile device adapted for use in forming and handling large precast concrete beams.

It is the general object of this invention to provide a mobile lift device which is rugged and durable in use; which is adapted to lift and transport very large objects; which is adjustable to handle objects of widely different lengths, and which is easy to operate and maneuver.

Another object of this invention is to provide a mobile lift having front and rear inverted U-shaped frames supported at their lower ends on wheels and interconnected by spaced side members and which has a novel hydraulic arrangement for steering the support wheels for the front frame and for also driving the front wheels, to thereby facilitate maneuvering of the mobile lift.

Another object of this invention is to provide a mobile device for use in forming and handling precast concrete beams, which device includes a hopper arrangement for filling the forms for the beams as the mobile lift device is moved therealong and a hoist apparatus for use in removing the forms from the cast beam and for lifting and transporting the finished beams.

A further object of this invention is to provide a mobile lift and hopper arrangement for use in forming precast concrete beams and the like and which is so arranged as to facilitate spreading of the concrete in layers lengthwise of the concrete beam during successive passes of the mobile lift along the beam.

These, together with various ancillary objects and advantages of this invention will be more readily appreciated as the same becomes better understood by reference to the following detailed description when taken in connection with the accompanying drawings wherein.

Figure 1:
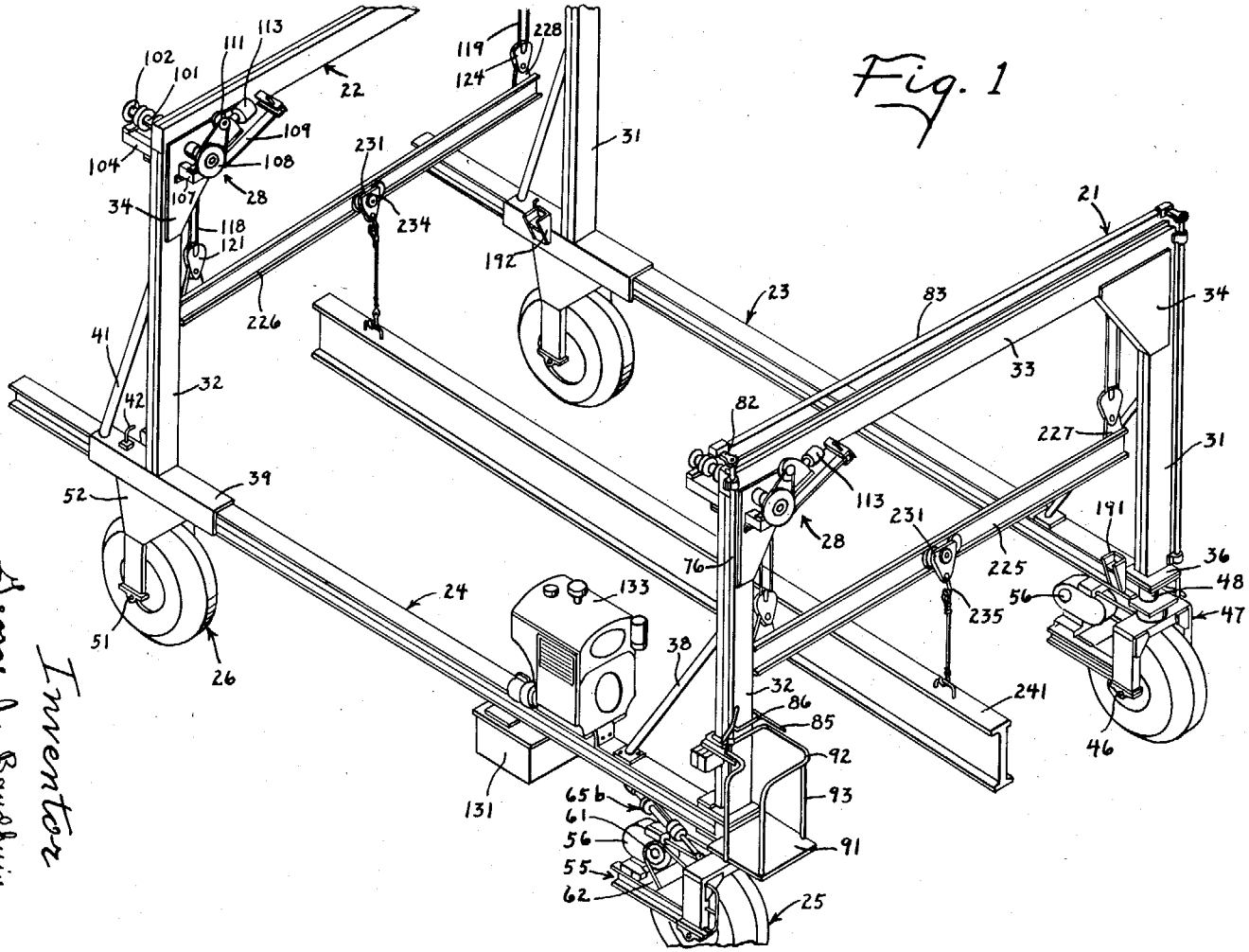
FIGURE 1 is a perspective view of the mobile lift device.

In general, the mobile lift includes front and rear U-shaped frames designated by the numerals 21 and 22 which are interconnected at their lower ends by spaced side beams 23 and 24. The lift is supported by pairs of front and rear wheels 25 and 26 and provision is made for both driving and steering the front wheels of the lift to provide a readily maneuverable self-propelled vehicle. The frames and side beams define an arch type structure for receiving the objects to be lifted and transported, and a hoist apparatus designated generally by the numeral 28 is provided on each the front and rear frames for lifting and supporting objects on the mobile lift.

More particularly, the front and rear frames 21 and 22 each include spaced upright members 31 and 32 which are interconnected at their upper ends by a cross member 33. The upright members and cross members may be formed in any desired manner and, as herein shown, are fabricated from two opposed channels disposed in face-to-face relation and welded together. Reinforcing gussets 34 are preferably provided at the juncture of the upright members with the cross member. The lower end of the front frame 21 is rigidly attached to the side beams 23 and 24 and for this purpose has a plate 36 attached to the lower end of each of the side members 31 and 32, which plates are bolted or otherwise rigidly secured to the ends of the side beams 23 and 24, respectively. Brace arms 38 are preferably provided and extend from each of the side members 31 and 32 down into engagement with a respective one of the side beams.

The lift is adapted to handle objects of widely different lengths and for this purpose the rear frame 22 is adjustably mounted on the side beams 23 and 24 for movement toward and away from the front frame 21. The lower ends of the side members 31 and 32 of the rear frame are attached to elongated slidable bearing members as for example sleeves 39 which slidably receive the side beams 23 and 24. A brace 41 extends between each of the side members 31 and 32 and the respective sleeve 39 to rigidify the same. A locking means, herein shown in the form of a clamp screw 42, is threadedly mounted on each of the sleeves 39 and arranged to engage the respective side beam to lock the sleeves in adjusted position thereon.

The front and rear wheels 25 and 26 are mounted on the mobile lift vehicle below the side beams by wheel support brackets or forks of suitable construction. In the specific form shown herein, the wheel support brackets are in the form of yokes which straddle the wheels. The front ground engaging wheels 25 are rotatably mounted on shafts 46 carried by a respective one of the front yokes 47 and the front yokes are each mounted for turning movement about an upright axis in bearings 48 secured to the forward ends of the side beams 23 and 24. As is apparent, the axes 46 of each of the wheels 25 are in vertical alignment with the respective side members 31 and 32 of the front frame so that the weight carried by the forward frame is imposed directly on the front wheels 25. The rear wheels 26 are mounted by axles 51 on yokes 52, which last-mentioned yokes are rigidly secured to the sleeve 39 attached to the lower end of the rear frame 22. The rear yokes 52 are also disposed in alignment with the respective side members 31 and 32 of the rear frame to impose the weight carried by the rear frame directly on the rear ground engaging wheels.

As previously described, provision is made for driving and turning the front wheels 25 of the lift to effect propelling and steering of the same. In accordance with the present invention, the drive for the front wheels includes an auxiliary frame 55 attached to each of the front yokes 47 for turning movement therewith and a drive motor 56 mounted on each auxiliary frame and operatively connected to a respective one of the front wheels 25. The auxiliary frame shown herein includes spaced side rails 57 attached to the depending legs of the front yokes 47 and extending rearwardly therefrom. The drive motors 56 are preferably of the hydraulic type and are adjustably mounted by a base 58 on the auxiliary frames. A stabilizing rod 59 is attached to the front yoke and to the upper end of each of the motors 56. The motors each include a drive sprocket 61 which is connected through a chain 62 to a driven sprocket 63 on the respective one of the front wheel axles 46. A means to be described more fully hereinafter is provided for reversibly controlling the flow of hydraulic fluid to the motors 56 to reversibly drive the mobile lift.

Figure 4:
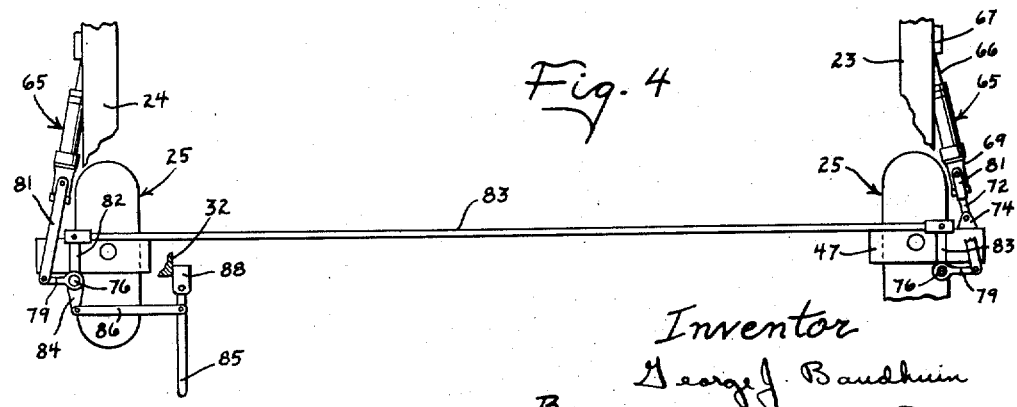
FIG. 4 is a diagrammatic plan view illustrating the steering arrangement for the front wheels of the lift.

Steering of the front wheels is preferably effected hydraulically by means of a conventional hydraulic steering booster such as the Series S23 steering booster manufactured by Vickers Incorporated, Detroit, Michigan. One of these steering boosters is provided for turning each of the front wheel yokes 47 and each includes a cylinder 65 having a piston therein connected to a rod 66 that extends outwardly of one end of the cylinder. The free end of the rod is swivelly connected by an anchor ball stud 67 to a bracket 68 attached to one of the side beams of the mobile lift. A 4-way control valve 69 is mounted on each of the steering cylinders 65 for movement therewith and has a control ball stud 71 which is movable relative to the control valve from a neutral position to an "extend" position or "retract" position. The cylinders 65 are connected through a bracket 72 and pivot pin 73 to spaced ears 74 on the respective one of the front steering yokes 47. As best shown in FIG. 4, the ears 74 are eccentrically located with respect to the pivot axis of the front yokes 47 so that when the hydraulic cylinder is extended or retracted, the front yokes 47 are turned accordingly.

The steering boosters are so arranged as to effect movement of the hydraulic cylinders 65 in a direction to tend to return the control ball stud to its neutral position. Thus, if the stud 71 is moved to the right as viewed in FIG. 5, fluid will be supplied to the piston in the cylinder 65 to extend the same. If movement of the stud 71 is then interrupted, the cylinder 65 will continue to extend until the cylinder moves the control valve relative to its control ball stud a distance sufficient to return the control ball stud to its neutral position. If the stud is continuously drawn toward an extended position, the cylinder 65 will continue movement toward its extended position. Similarly, when the control stud is retracted, the cylinder will retract until the control stud is returned to its neutral position.

The control ball studs 71 on the steering boosters at each side of the mobile lift are operatively interconnected so as to actuate the several steering boosters in synchronism with each other. The linkage for interconnecting the steering boosters is arranged to extend along the upright side members 31 and 32 and cross members 33. More particularly, a pair of upright rods 76 are rotatably journaled in bearings 77 attached to the upright members 31 and 32 and have lower radial arms 79 on the lower ends thereof which are operatively connected by links 81 to the respective control studs 71 on the steering boosters. Upper radial arms 82 are attached to the upper ends of the rods 76 and are operatively interconnected with each other by a connecting rod 83 which is pivotally attached to the free ends of the upper arms. A control arm 84 is attached to one of the rods 76, intermediate the ends thereof, and is connected to an operating handle 85 through a linkage 86. As best shown in FIG. 4, the operating handle 85 is pivotally mounted by a bracket 88 on the upright side member 32 of the front frame.

A control station is provided on the front frame and includes a platform 91 secured to the front frame adjacent the lower end of the side member 32 to project forwardly of the front frame. A guard rail 92 including upright posts 93 is provided around the platform and a ladder 95 is provided on the front wheel yoke 47 to aid the operator in entering and leaving the platform 91.

Figure 2:
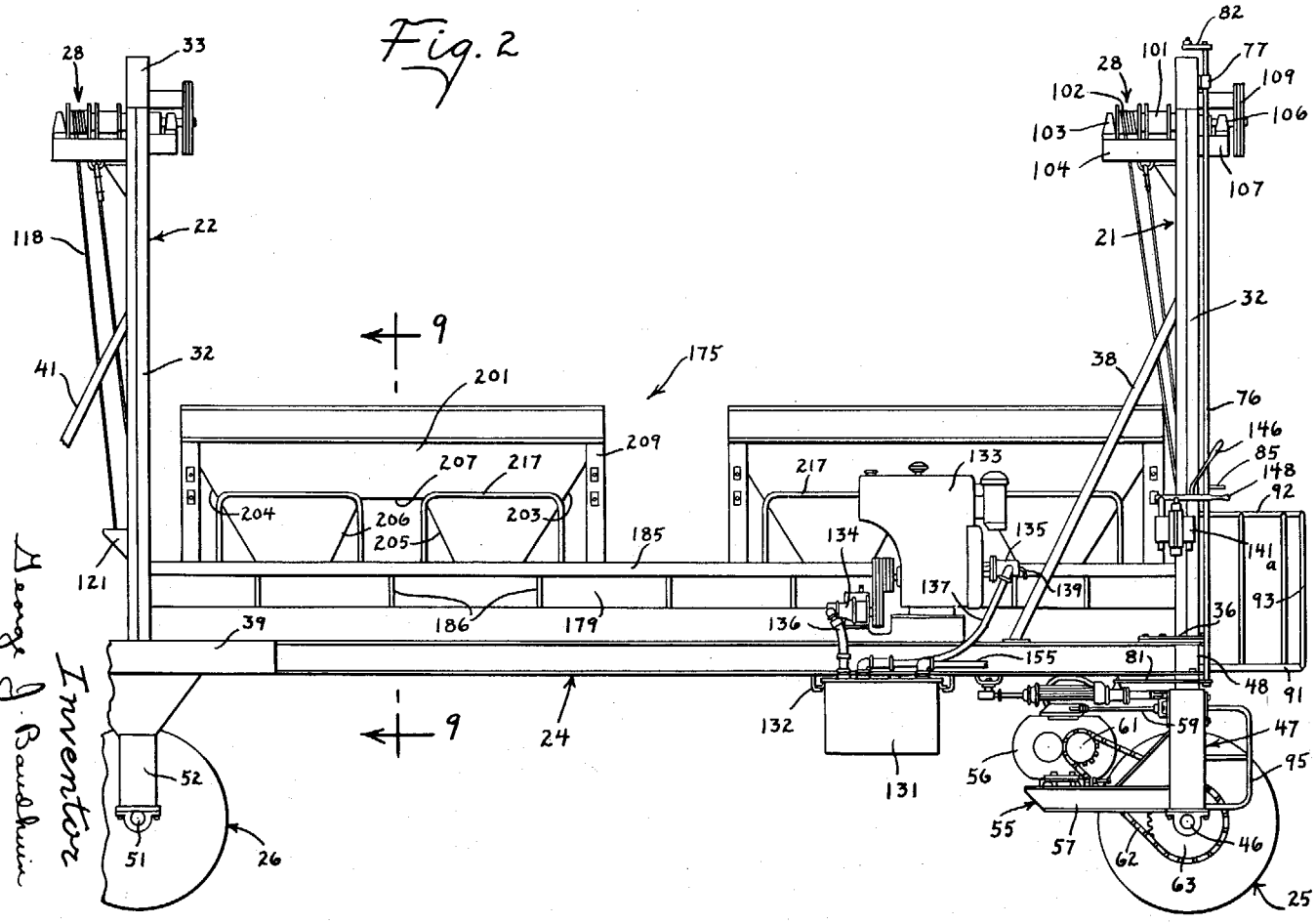
FIG. 2 is a side elevational view of the mobile lift device having the hopper apparatus for pouring precast concrete beams mounted thereon.
Figure 3:
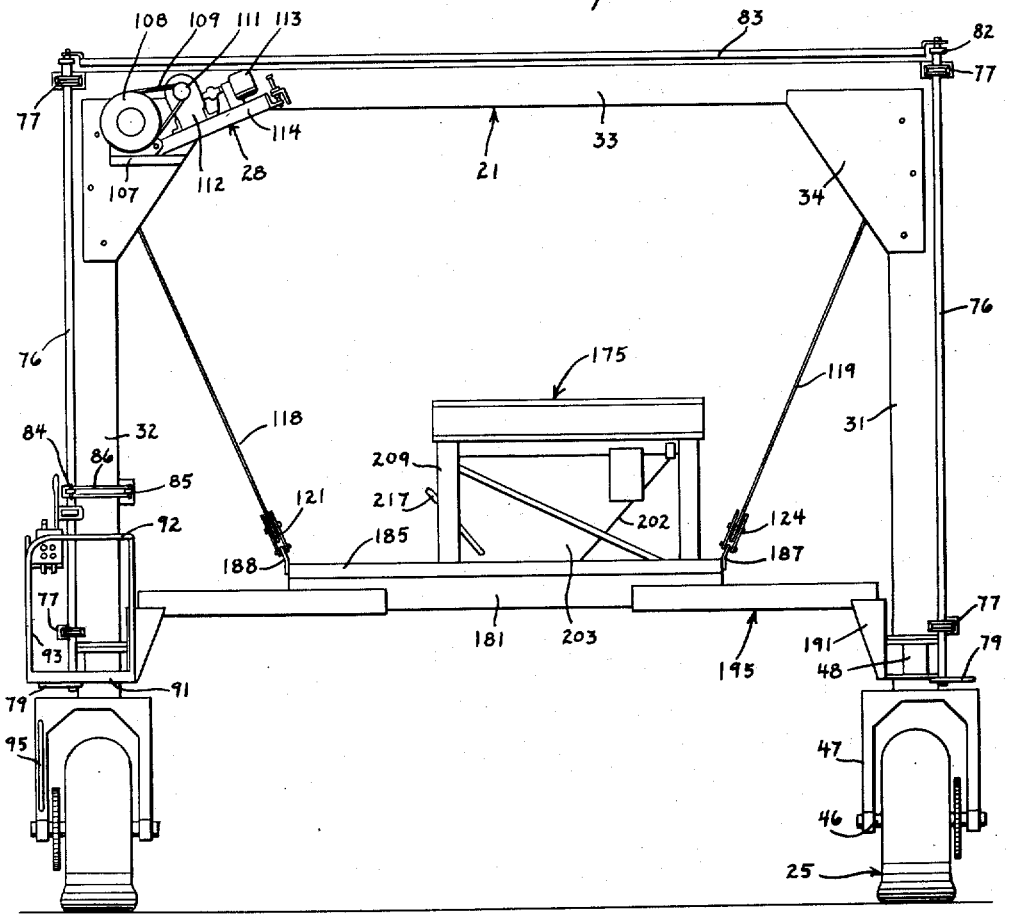
FIG. 3 is a front end view of the mobile lift device and showing the hopper apparatus mounted thereon.
Figure 7:
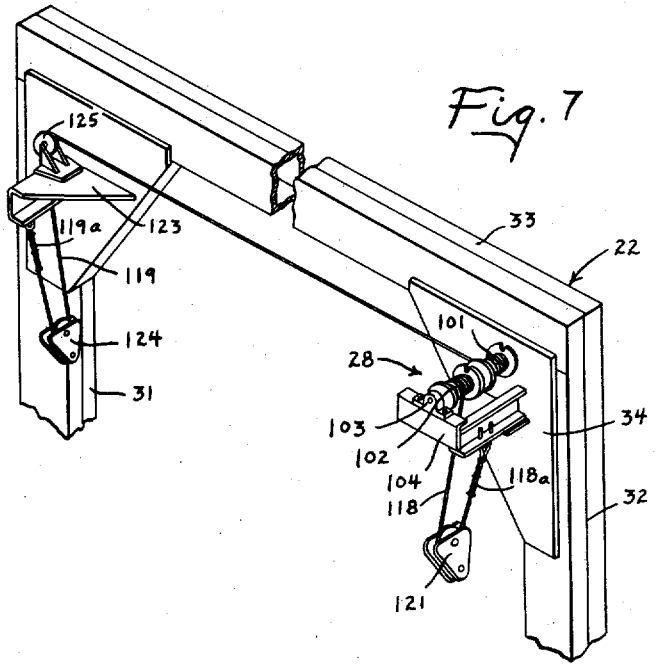
FIG. 7 is a fragmentary perspective view of the rear frame of the vehicle and illustrating the winch arrangement.
Figure 9:
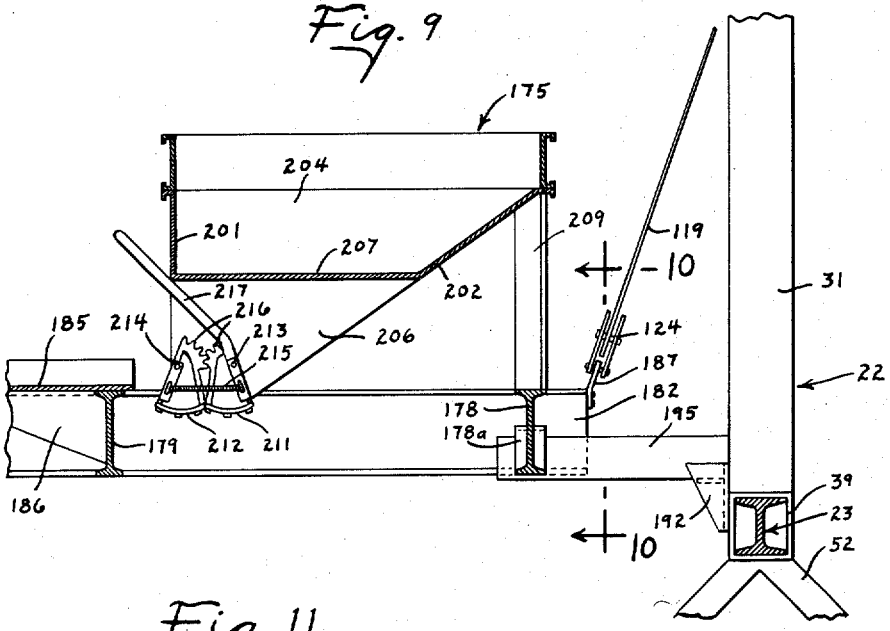
FIG. 9 is a fragmentary vertical sectional view taken on the plane 9—9 of FIG. 2.
Figure 11:
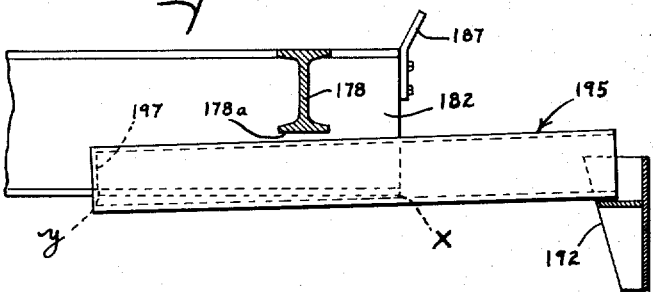
FIG. 11 is a fragmentary sectional view taken on the plane 11—11 of FIG. 10.
Figure 10:
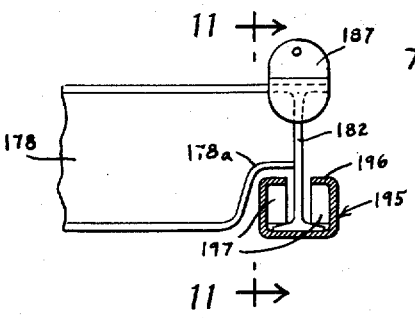
FIG. 10 is a fragmentary enlarged sectional view taken on the plane 10—10 of FIG. 9.

A hoist apparatus or winch 28 is provided on each of the front and rear frames 21 and 22 for elevating and lower objects and for supporting the objects during transportation thereof. Each of the winches 28 includes a pair of drums 101 and 102 which are operated in synchronism with each other and are conveniently mounted on a common shaft. As best shown in FIGS. 2 and 7, winch mounting brackets 104 and 107 are attached to each of the frames 21 and 22, at opposite sides thereof, and carry bearings 103 and 106 to rotatably support the drum attached to the shafts. A sprocket 108 is attached to one end of each of the drum shafts and is operatively connected through a chain 109 to the drive sprocket 111 of a speed reducer 112. The speed reducer 112 and the hydraulic drive motor 113 therefor are conveniently attached to a platform 114 which is pivotally mounted on the bracket 107 for vertical pivotal movement about an axis eccentric to the axis of the drum shaft so as to thereby permit tensioning of the drive chain 109.

Each of the winches is arranged to operate a pair of cables 118 and 119 which are suspended from the upper end of the frame and adjacent opposite sides thereof. The cable 118 has the end 118a thereof affixed to the bracket 104 (see FIG. 7) and is entrained intermediate its ends over a pulley block 121. The other end of the cable is wound on the drum 102. Cable 119 has the end 119a thereof attached to a bracket 123 located at the side of the mobile lift opposite the bracket 104 and is entrained intermediate its ends over a pulley block 124. A guide pulley 125 is also mounted on the bracket 123 to support the cable 119 and the cable extends from the pulley 125 cross-wise of the lift to the drum 101. As is apparent, the cables are wound on the respective drums 101 and 102 in such a manner as to simultaneously raise or lower the respective pulley blocks 124 and 121 in unison with each other as the drums 101 and 102 are rotated.

Figures 5, 6:
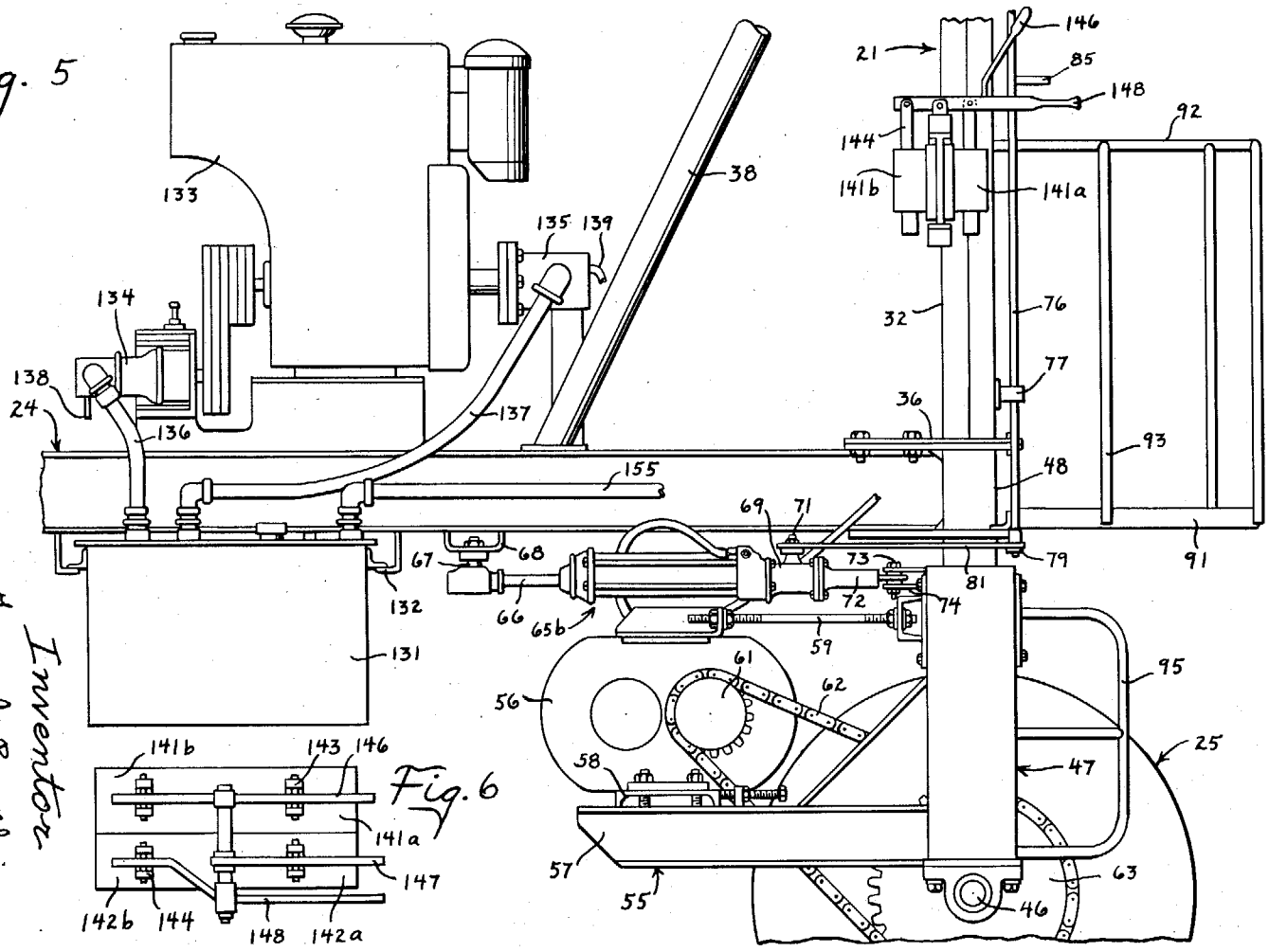
FIG. 5 is an enlarged fragmentary side elevational view of the mobile lift and illustrating the front wheel drive and steering arrangement.
FIG. 6 is a diagrammatic view illustrating the arrangement of the hydraulic control operating levers.

Hydraulic fluid is supplied to the several drive motors, hoist motors and steering boosters from a common pump and reservoir assembly on the mobile lift and, as best shown in FIGS. 2 and 5, a reservoir 131 is mounted on the side beam 24 by brackets 132. A prime mover such as an internal combustion engine 133 is also mounted on the side beam 24 and in such a manner as to not obstruct the free open space between the side beams. The motor 133 is arranged to drive the hydraulic pumps for operating the several hydraulic motors and, in accordance with the present invention, a pair of pumps designated 134 and 135 are operatively connected to the motor 133 to be driven thereby. The pumps 134 and 135 respectively include suction lines 136 and 137 which communicate with the reservoir 131 and delivery lines 138 and 139. The hydraulic circuit for operatively connecting the pumps to the several motors is diagrammatically shown in FIG. 8 and, for convenience, the drive motors for the left and right sides of the mobile lift are designated respectively by the numerals 56l and 56r and the hoist motors 113 for the front and rear frames are designated by the letters 113f and 113r respectively. The valves 69 on the hydraulic steering boosters for the left and right hand sides of the mobile lift are respectively designated by the letters 69l and 69r.

Control valves 141a and 141b are provided for controlling the flow of fluid to and from the drive motors 56l and 56r and control valves 142a and 142b are provided for controlling the flow of fluid to and from the hoist motors 113f and 113r respectively. The valves 141a and 141b are conventional four-way valves and include an operator 143. Similarly, the valves 142a and 142b are four-way valves having an operator 144. The drive motors 56l and 56r may conveniently be operated in unison, and, as diagrammatically shown in FIG. 6, a common operating lever 146 is mounted on the valve casing and connected to the operators 143 of the valves 141a and 141b. The hoist motors 113f and 113r are preferably independently operated as by levers 147 and 148 also mounted on the valve casings and connected to the operators 144 of valves 142a and 142b respectively.

In order to utilize both pumps 134 and 135 during driving of the lift, the valves 141a and 141b are respectively connected through conduits 151 and 152 to the delivery conduits 139 and 138 of pumps 135 and 134. The valves 141a and 141b are also connected through conduits 153 and 154 to the return line 155 leading to the reservoir 131. Fluid from pump 135 is thus reversibly supplied through valve 141a and conduits 156 and 157 to the drive motor 56l and fluid from pump 134 is supplied through valve 141b and conduits 158 and 159 to the other drive motor 56r.

Both pumps are similarly used during hoisting operations and for this purpose the valves 142a and 142b are connected through conduits 161 and 162 to the delivery conduits 139 and 138. These valves are otherwise connected through conduits 163 and 164 to the return conduit 155. Control valve 142a is connected to the hoist motor 113f at the front of the lift through conduits 165 and 166 and the valve 142b is connected through conduits 167 and 168 to the hoist motor 113r at the rear of the lift. Fluid under pressure from conduit 139 is also supplied through conduit 171 to the valve 69r on the right steering booster, which valve is otherwise connected to the return line through conduit 172. Fluid under pressure from supply conduit 138 is supplied through conduit 173 to the valve 69l on the left steering booster, which valve is otherwise connected through conduit 174 to the reservoir 131.

The aforedescribed conduits which interconnect the pumps, motors and valves are arranged to extend alongside the side beams and main frames so as to not obstruct the generally open arch structure formed thereby. However, in order to simplify the drawings, the several hydraulic conduits have not been illustrated. In general, the conduits 158 and 159 leading from the valve 141b to the left drive motor 56l extend alongside the upright and cross members of the front frame 21 as do the conduits 173 and 174 leading to the valve 69l on the left steering booster. The conduits for the rear hoist motor 113r extend from the valve 142b alongside the beam 24 and thence upwardly along the rear frame 22.

The mobile lift of the present invention is particularly adapted for use in the forming and handling of concrete beams and for this purpose there is provided a hopper apparatus designated generally by the numeral 175 which is arranged to be lifted and supported on the mobile lift and to be transported thereby in a direction lengthwise of the forms to thereby permit dispensing of the concrete in layers longitudinally of the beams. After each layer of concrete is poured into the forms, the concrete is subjected to a tamping and compacting operation after which a subsequent layer is poured thereinto. In accordance with the present invention the hopper apparatus embodies a plurality of hoppers which are aligned in a direction lengthwise of the mobile lift and have independently operable discharge valves arranged so that a portion of the concrete carried by the hopper apparatus can be dispensed through each discharge valve to facilitate pouring of the beam in layers.

The hopper construction is best shown in FIGS. 2, 3, 9, 10 and 11 and includes a main frame composed of spaced longitudinal I-beams 178 and 179 which are attached at the ends thereof to front and rear cross beams 181 and 182. As herein shown, the longitudinal I-beams and the cross beams are substantially the same depth and, for reasons which will become apparent from the following description, one of the side I-beams 178 is notched as indicated at 178a in the lower edge thereof at the point of juncture with each front and rear cross beams. The cross beams 181 and 182 extend laterally from one side of the longitudinal I-beam 179 and support an operator's platform 185 thereon, which platform extends longitudinally of the frame. Gussets 186 are attached to the beam 179 at spaced points therealong to aid in supporting the platform 185. Brackets 187 and 188 are secured to opposite ends of the front and rear cross beams 181 for attachment to the pulley blocks 124 and 121 respectively by which the hopper frame is elevated and lowered.

Provision is made for supporting the hopper frame on saddles 191 and 192 attached to the mobile lift. The front saddles 191 are attached to the side beams 23 and 24 adjacent the forward ends thereof and the rear saddles 192 are attached to the sleeve 39 for adjustment longitudinally of the side beams. In this manner, the spacing between the front and rear saddles can be selectively varied to receive the shoes 195 attached to the hopper frame and support the hopper on the mobile lift. The front and rear shoes 195 are similar and, as best shown in FIGS. 3 and 9–11, the shoes are slidably supported on the front and rear cross members 181 and 182 for adjustment laterally of the hopper frame. The shoes have a generally U-shaped cross-section arranged to slidably receive the flange along the lower edge of the cross members 181 and 182 and have inwardly extending flanges 196 along the upper edge thereof which terminate in spaced relation to receive the web portion of the cross members therebetween. Plates 197 are welded to the inner ends of the shoes 195 and are arranged to engage the top of the lower flange on the cross members, as clearly shown in FIGS. 10 and 11. With this arrangement the shoes 195 can be manually drawn outwardly to rest in the saddles 191 and 192. When the cables 118 and 119 are then allowed to become slack, the frame moves downwardly until the shoes 195 rest in the saddles 192 and support the hopper frame by engagement with the cross members 181 and 182 at the points designated x and y in FIG. 11. As will also be noted, this arrangement permits some adjustment of the hopper laterally with respect to the upright side members of the front and rear frames, when the hopper is supported by the shoes 195.

In the embodiment illustrated, there are provided four hoppers arranged in pairs on the main hopper frame. The hoppers of each pair are similar and include an upright side wall 201 disposed alongside the operator's platform 185 and an inclined side wall 202 which terminates at its lower end in spaced relation to the side wall 201 to define a discharge opening therebetween. The hoppers also include relatively converging front and rear walls 203 and 204 (see FIG. 2) and intermediate walls 205 and 206 which converge respectively with the front and rear walls. A panel 207 extends between the intermediate walls 205 and 206 as is clearly shown in FIG. 9. Each pair of hoppers is supported at the corner thereof by upright posts 209 attached to the main hopper frame. Independently operable valves 211 and 212 are pivotally mounted on each of the hoppers by pins 213 and 214 (see FIG. 9) and yieldably urged to a closed position by a spring 215. Sector gears 216 are provided to operatively interconnect the valve members and effect simultaneous movement of the same in opposite directions and an operating lever 217 is attached to one of the valve members 211 to thereby effect opening and closing of the same. With this arrangement, the discharge outlets of each of the several hoppers are disposed in alignment longitudinally of the hopper frame and approximately medially between the upright members 31 and 32 of the front and rear frames. The hopper apparatus is arranged to hold a relatively large quantity of concrete preferably sufficient to pour the entire beam and is made relatively long and low to facilitate filling of the hoppers. In pouring of the concrete beam, the mobile lift is propelled to move the discharge outlets longitudinally of forms for the beam. The several discharge valves for the hopper apparatus are each independently operable and each control dispensing of only a portion of the concrete carried by the hopper apparatus so as to thereby facilitate pouring of the concrete from the hopper apparatus into the forms for the beams in separate layers during successive passes of the lift along the forms.

The mobile lift may thereafter be used to remove the forms and to also transport the finished beam to the desired location. For this purpose, a pair of rails 225 and 226 are provided, which rails have brackets 227 and 228 respectively at opposite ends thereof to receive the pulley blocks 121 and 124. With this arrangement, the rails 225 and 226 are vertically adjustably supported by the cables 118 and 119 at each the front and rear frames 21 and 22. One or more transversely movable carriages 231 are provided on each of the rails 225 and 226 for movement therealong in a direction transversely of the mobile lift. The carriages herein shown are of the so-called geared-type having an operating wheel 234 which is adapted upon rotation to drive the carriage in one way or the other along the respective rail. As is apparent, the hooks 235 on the carriage can be connected to the forms for the concrete beam, to facilitate moving the same upwardly and outwardly during removal thereof, and also can be connected to the beam 241 itself as shown in FIG. 1 to elevate and transport the same.

Figure 12:
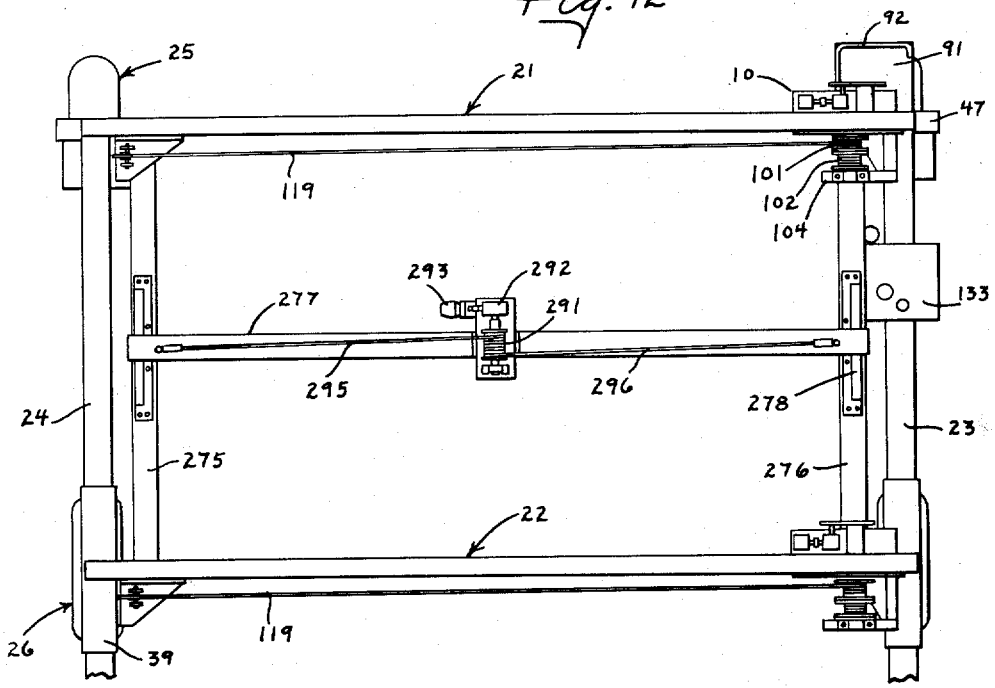
FIG. 12 is a top plan view of the mobile lift and hoist apparatus.
Figure 13:
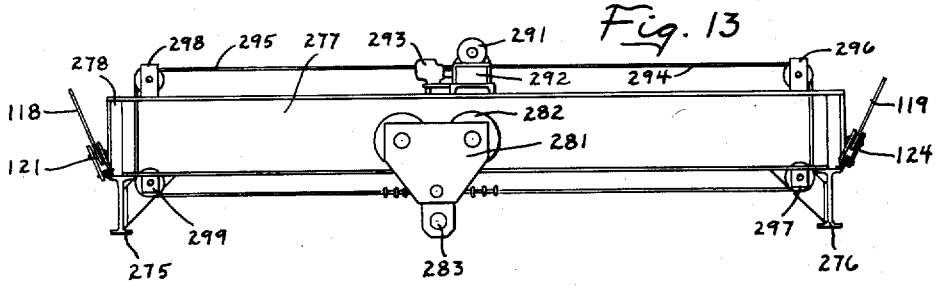
FIG. 13 is a front elevational view of the hoist apparatus.

A modified form of hoist apparatus is illustrated in FIGS. 12 and 13. In that arrangement, a cross beam 277 extends between and is supported by two parallel beams 275 and 276. As shown, the cross beam overlies the beams 275 and 276 and is braced with respect thereto by angle irons 278. The spaced beams 275 and 276 are arranged for attachment to the hoist cables 118 and 119 on the front and rear frames and, as herein shown, the beams 275 and 276 extend longitudinally of the mobile lift. With this arrangement, the forward and rear ends of the beam 275 are supported on the pulley blocks 121 on each the front and rear frames, and the forward and rear ends of the beam 276 are supported on the pulley blocks 124.

Figure 8:
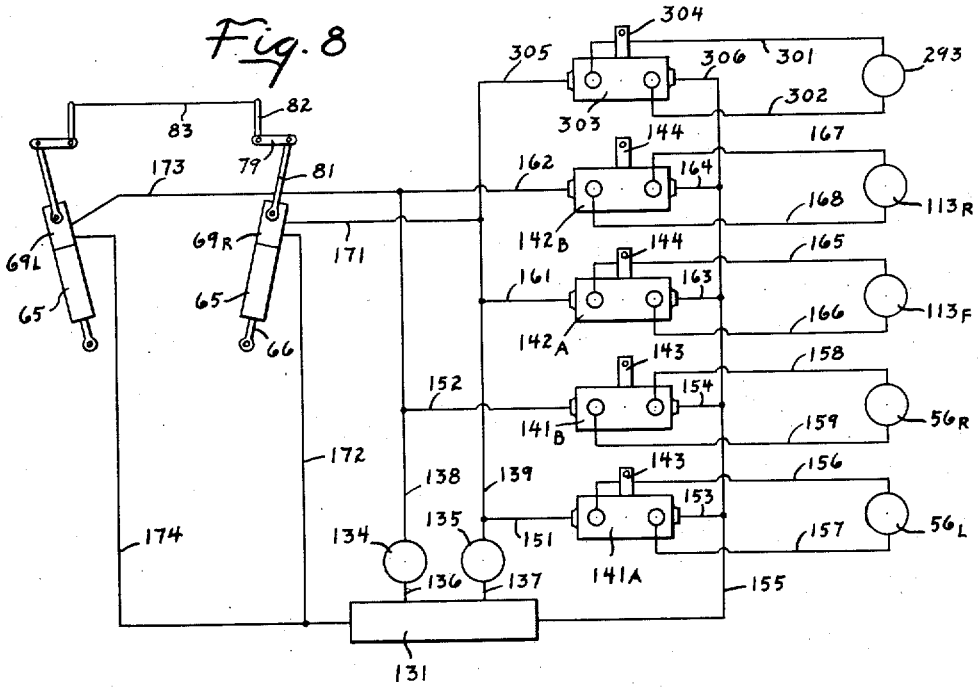
FIG. 8 is a schematic diagram illustrating the hydraulic control circuit for the mobile lift.

The cross beam 277 is preferably of I-shaped cross-section and has a carriage 281 mounted by wheels 282 on the lower flange thereof. The carriage has an opening 283 therein adapted to receive a hook or chain to support an object thereon and, in accordance with the present invention, provision is made for driving the carriage 281 longitudinally of the beam 277 and crosswise of the mobile lift. This is conveniently effected by means of a winch drum 291 which is mounted on the upper edge of the cross beam and driven through a reduction gear assembly 292 from an hydraulic motor 293. A pair of cables 294 and 295 are wound in opposite directions around the winch drum 291. The cable 294 is trained over an upper pulley 296 adjacent the end of the cross beam and downwardly through aligned openings in the beam and over a lower pulley 297. The end of the cable 294 is attached to the carriage 281 to draw the same to the right as viewed in FIG. 13 when the hydraulic motor is operated to wind the cable 294 on the drum 291. The other cable 295 is entrained over pulleys 298 and 299 and is terminally attached to the carriage 281 to draw the latter in the opposite direction. The transfer motor 293 may also conveniently be operated from the common hydraulic supply source and, as in FIG. 8, is connected through conduits 301 and 302 to a control valve 303 conveniently located at the control station alongside the valves 141 and 142. The control valve 303 includes an operator 304 and has the inlet thereof connected through conduit 305 to the supply conduit 139. The valve is otherwise connected through a conduit 306 to the return conduit 155 leading to the fluid reservoir 131. The valve 303 is operable to reversibly control the flow of fluid to the motor 293 to thereby reversibly operate the same and move the carriage 281 in either direction along the cross beam 277. With this arrangement it will be noted that an object carried by the carriage 281 can be readily manipulated to any desired position. In particular, the object can be elevated and lowered by cables 118, 119 on the hoists 28; moved in a direction longitudinally of the vehicle by propelling the same; and moved laterally of the vehicle by operating the motor 293 to move the carriage 281 along the cross beam 277.

I claim:

1. A mobile lift vehicle of the type having a free central span for straddling objects to be lifted and transported comprising two straight, spaced, horizontally disposed structural steel beams forming side frame members, an upright fixed frame comprising an inverted U-shaped rigid steel frame having its legs fixed to the forward ends of said side frame members for the sole support of said fixed frame, a movable upright frame unit comprising a sleeve snugly surrounding each of the side frame members slidable longitudinally thereon, a second inverted U-shaped upright rigid steel frame having its legs fixed to said sleeves for the sole support of the second upright frame, a wheel fork affixed to each of said sleeves below the side frame members and a wheel mounted for rotation in each of said forks, the forks being attached to the sleeves to position the axis of the wheels substantially in vertical alignment with the second upright frame, a front wheel fork pivotally attached to each of the side frame members adjacent the front end thereof extending downwardly therefrom, a wheel mounted for rotation in each of the front forks, the forks being shaped to position the axes of the wheels substantially in vertical alignment with the fixed frame, an engine mounted solely on one of said side frame members, at least one pump driven by said engine, hydraulic motors connected to the pump and mounted on each of said front forks and each connected to the wheel mounted on the same fork for driving the front wheels, hydraulic steering units for turning the front forks to effect steering of the vehicle, and control means for controlling the application of hydraulic pressure from the pump to the motors and the steering units.

2. A mobile lift vehicle of the type having a free central span for straddling objects to be lifted and transported comprising two straight, spaced, horizontally disposed steel beams forming side frame members, a first upright inverted U-shaped steel frame having its legs attached to the forward ends of said side frame members for the sole support of said first frame, a movable upright frame unit comprising a slidable bearing member on each of the side frame members slidable longitudinally thereon, a second inverted U-shaped upright steel frame having its legs fixed to said bearing member for the sole support of the second upright frame, a set of rear wheel forks attached to said movable upright frame unit and extending below the side frame members, a wheel mounted for rotation in each of said forks, the forks being attached to the upright frame unit to position the axes of the wheels approximately in vertical alignment with the legs of the second upright frame, a set of front wheel forks, means mounting the front wheel forks on the legs of the first upright frame, said front wheel forks extending downwardly from said first upright frame, at least one of the sets of forks being mounted for pivotal movement about a vertical axis for steering the vehicle, a wheel mounted for rotation in each of the front forks, the forks being located to position the axes of the wheels approximately in vertical alignment with the legs of the first frame, an engine mounted on one of said side frame members, pump means driven by said engine, an hydraulic motor on each side of the vehicle connected to the pump means and each mounted in proximity to a fork of one of said sets of forks, means for connecting each motor to drive the wheel on the adjacent fork to propel the vehicle, hydraulic steering units for turning at least one set of forks to effect steering of the vehicle, and control means for controlling the application of hydraulic pressure from the pump means to the motors and the steering units.

3. The combination of claim 2 including a platform for the reception of an operator disposed at the front end of said side frame members and fixed with respect thereto defining a control station and wherein said control means for the wheel motors and the steering unit is located at said control station.

4. The combination of claim 2 wherein the distance between the ground-engaging surface of the wheels and the side frame members is not more than one-third of the overall height of the vehicle.

5. The combination of claim 2 wherein the engine is mounted in close proximity to the first upright frame for movement of the movable frame unit through the major portion of the length of the side frames.

6. The combination of claim 2 wherein each front wheel fork includes a bracket portion on which the hydraulic motor is mounted, a sprocket is attached to the motor shaft and to the adjacent wheel, and a chain connects the sprockets.

7. The combination of claim 2 including a winch and cable mounted on each of said upright frames, an hydraulic winch motor mounted on each of the upright frames for driving the winch to lift and support objects suspended from the upright frames, means for connecting the hydraulic motors to the pump means, and control means for independently controlling the operation of said winch motors.

8. The combination of claim 7 having a saddle attached to each of said bearing members and to each of said side frame members adjacent the front end thereof, a hopper unit comprising a hopper frame having shoes for reception in said saddles to support the hopper unit on the vehicle, means on the hopper unit for engagement with the cables for lifting the hopper unit into and out of position on the saddles, said hopper unit comprising a plurality of hoppers having bottom openings, closures for said bottom openings, and means for operating the closures between open and closed positions.

9. The combination of claim 2 including a saddle attached to each of said bearing members and to each of said side frame members adjacent the front end thereof, a hopper unit comprising a hopper frame having shoes for reception in said saddles to support the hopper unit on the vehicle, said hopper unit having a plurality of discharge outlets disposed between said side frame members and aligned longitudinally of said vehicle, closures for said bottom openings, and means for operating the closures between open and closed positions independently of one another.

10. The combination of claim 9 wherein said shoes are extensible and retractable laterally of said hopper frame.

11. The combination of claim 9 including an operator platform along one side of said hopper frame.

12. The combination of claim 2 including a winch on each of said upright frames and a pair of cables connected to each of said winches and suspended from the top of said upright frame adjacent opposite sides thereof, an hydraulic winch motor mounted on each of the upright frames for driving the winches, means for connecting the hydraulic winch motors to the pump means and control means for independently controlling operation of said winch motors, a transverse beam suspended from the cables of said upright frames, and a hoist carriage mounted on the transverse beam to support articles for movement transversely of the vehicle.

13. The combination of claim 2 including a winch on each of said upright frames and a pair of cables connected to each of said winches and suspended from the top of said upright frames adjacent opposite sides thereof, an hydraulic winch motor mounted on each of the upright frames for driving the winches, means for connecting the hydraulic winch motors to the pump means and control means for independently controlling operation of said winch motors, a pair of spaced beams, means connecting the ends of said spaced beams to the cables on said front and rear frames, a cross rail extending between said spaced beams, and a carriage mounted on said cross rail for movement therealong.

14. The combination of claim 13 including winch means mounted on said rail, and cables attached to said winch means and operatively connected to said carriage for moving the carriage along the rail.

15. The combination of claim 2 wherein said side frame members comprise structural steel beams of I-shaped cross-section.

16. The combination of claim 2 wherein the length of each of said bearing members is less than approximately one-quarter the length of said side frame members, said side frame members extending rearwardly from said first upright frame in free unobstructed relationship from a point adjacent said first upright frame to the rear ends of said frame members to permit movement of the bearing members along said frame members through the major portion of their length for adjustment of the position of the wheels and the movable upright frame unit with respect to the side frame members, said upright frames constituting the sole means for spacing the side frame members.

17. The combination of claim 2 including a winch on each of said upright frames, a pair of cables connected to each of said winches and suspended from the top of a respective one of said upright frames adjacent opposite sides of the vehicle, an hydraulic winch motor mounted on each of the upright frames for driving the winches, means for connecting the hydraulic winch motors to the pump means and control means for independently controlling operation of said winch motors, at least one transverse beam suspended from the cables of said upright frames, a hoist carriage mounted on the transverse beam to support articles therefrom, and an hydraulic motor carried on the beam for moving the carriage transversely of the vehicle.

18. The combination of claim 2 including a winch on each of said upright frames, a pair of cables connected to each of said winches and suspended from the top of a respective one of said upright frames adjacent opposite sides thereof, an hydraulic winch motor mounted on each of the upright frames for driving the winches, at least one transverse beam suspended from cables on opposite sides of said frames, a mobile hoist carriage mounted for movement along the transverse beam to support articles therefrom, a carriage winch carried on said transverse beam, a cable connected to the carriage winch and to said hoist carriage, an hydraulic motor for driving the carriage winch to move the carriage and articles supported thereby transversely of the vehicle, and means for connecting the hydraulic winch motors to the pump means and control means for independently controlling operation of the winch motors.

*19. A mobile lifting vehicle of a type having a free central span for straddling objects to be lifted and transported, comprising, two straight spaced horizontally disposed structural beams, a first inverted vertically disposed* U-*shaped frame having one each of its legs slidably secured to one each of said beams, a second inverted vertically disposed* U-*shaped frame having one each of its legs secured to one each of said beams, a pair of forks including a wheel fork affixed to each of said legs of said first frame below said beams, a wheel mounted for rotation in each of said forks, said forks supporting said wheels such that the axes of said wheels are substantially in vertical*

*alignment with said first frame, a second pair of forks including a second wheel fork pivotally attached to each of said beams and extending downwardly therefrom, a wheel mounted for rotation in each of said second forks, said second forks positioning the axes of the wheels substantially in vertical alignment with said second frame, an engine mounted on said vehicle, at least one pump driven by said engine, hydraulic motors connected to the pump*

*and mounted on each of one of said pairs of forks, and each connected to that wheel mounted on the same fork for driving that wheel, hydraulic steering units for turning one of said pair of forks to effect steering of the vehicle and control means for controlling the application of hydraulic pressure from the pump to the motors and steering units.*

No references cited.